(12) United States Patent
Rickett et al.

(10) Patent No.: US 6,661,375 B2
(45) Date of Patent: Dec. 9, 2003

(54) BEAM STEERING IN SUB-ARRAYED ANTENNAE

(75) Inventors: Bryan Stephen Rickett, Hampshire (GB); Peter John Wright, Salisbury (GB); Nicholas Alfred Carter, Romsey (GB)

(73) Assignee: Roke Manor Research Limited, Hampshire (GB)

( * ) Notice: Subject to any disclaimer, the term of this patent is extended or adjusted under 35 U.S.C. 154(b) by 0 days.

(21) Appl. No.: 10/076,088

(22) Filed: Feb. 15, 2002

(65) Prior Publication Data

US 2002/0180639 A1 Dec. 5, 2002

(30) Foreign Application Priority Data

Feb. 15, 2001 (GB) .............................................. 0103743
Oct. 3, 2001 (GB) .............................................. 0123739

(51) Int. Cl.[7] .............................. H01Q 3/22; G01S 3/16
(52) U.S. Cl. ........................ 342/372; 342/373; 342/383
(58) Field of Search ............................... 342/372, 373, 342/383

(56) References Cited

U.S. PATENT DOCUMENTS 5,079,557 A * 1/1992 Hopwood et al. .......... 342/372
5,854,610 A * 12/1998 Wojtowicz et al. ......... 342/372
6,016,123 A * 1/2000 Barton et al. ............... 342/373
2002/0167445 A1 * 11/2002 Eden ........................... 342/383

FOREIGN PATENT DOCUMENTS

EP 0917240 5/1999
FR 2741478 5/1997
JP 2000174537 6/2000
JP 2001094331 4/2001

* cited by examiner

Primary Examiner—Thomas H. Tarcza
Assistant Examiner—Fred H Mull
(74) Attorney, Agent, or Firm—Crowell & Moring LLP (57) ABSTRACT

A method is presented for operating a phased array antenna comprising a number of sub-arrays. The method comprises the steps of introducing phase offsets into signals received from/transmitted to each element in the antenna, to provide directional transmit or receive sensitivity in a first direction; summing signals received from each element in each sub-array to provide respective sub-array signals; introducing respective phase offsets into the respective sub-array signals to adjust the direction of maximum sensitivity within a sensitivity envelope defined by the phase offsets applied to each element of the antenna as a whole. The method further comprises the step of adjusting the phase offset of each element of each respective sub-array by a respective amount, thereby to alter the directional sensitivity of each respective sub-array, respective sub-arrays having the phase offset of their elements adjusted by differing amounts thereby providing the sub-arrays with a variety of directional sensitivities diverging from the first direction.

21 Claims, 7 Drawing Sheets

Fig. 7 Fan of seven beams spread over 20° arc in azimuth.

BEAM STEERING IN SUB-ARRAYED ANTENNAE

BACKGROUND OF THE INVENTION

Phased array antennae are used in communications systems and radar systems to provide adjustable directionality of transmission and reception, without the need to physically displace the antenna.

A phased array antenna consists of many individual antenna elements arranged in an array, typically a linear (one-dimensional) or matrix (two-dimensional) Layout. The elements are typically spaced from each other by a distance equal to one half of the wavelength of interest.

In reception mode, the signals received by each element are summed together to provide an overall received signal. With no phase difference introduced into the signals from the various elements, the antenna is most sensitive to signals arriving from a direction perpendicular to the plane of the antenna array. By introducing a progressive phase delay into the various elements, the direction of maximum sensitivity may be adjusted.

Figure 1:
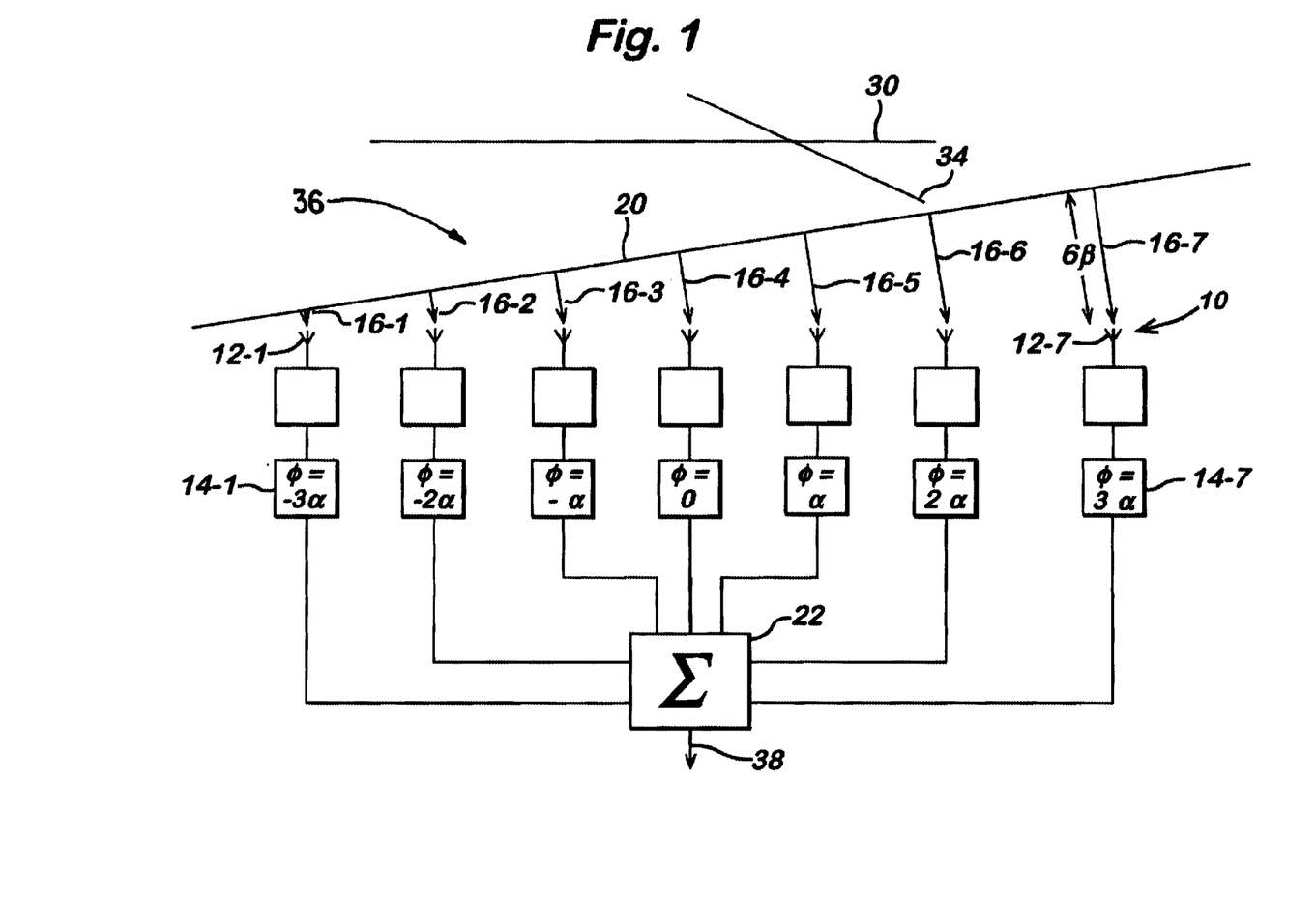
FIG. 1 shows a one-dimensional array of antenna elements with associated phase delay elements.

For example, FIG. 1 shows a one-dimensional array 10 of antenna elements 12-1 to 12-7 in which each element is associated with a phase delay 14-1 to 14-7 of a greater than that of the preceding element. A wave-front 20 is shown, arriving in the direction of maximum sensitivity. The path length 16-1 to 16-7 to be travelled by the wave-front increases from zero at element 12-1 to 6β at 16-7. The path length β is the distance travelled by wave-front 20 in the time taken for a phase angle of α to be travelled by wave-front 20. That is, $\beta=\lambda\cdot\alpha/2\pi$, where $\lambda$ is the wavelength of the signal producing wave-front 20. The effect of this and the phase delays 14-1 to 14-7 is that summing unit 22 receives signals corresponding to wave-front 20 from each antenna element at the same time. These signals will sum 38 to produce a large response to wave-front 20. For signals arriving from different directions, such as wave front 30, the summing unit 22 will receive signals corresponding to wave-front 30 at different times, since the phase delay introduced by phase delay elements 14 is not compensated by a corresponding difference in path length. The signals received at the summing unit 22 will arrive at different times, and will not add up 38 to a large response. Signals corresponding to wave-front 34 will arrive over an even wider spread of timings, and the sensitivity of the array 10 to the wave-front 34 is even less than to wave-front 30.

The summer 22 may apply a weighting scheme to the various signals from antenna elements 12 to provide a degree of aperture shading.

By analogy, similar considerations may be applied to transmission of signals. That is, a single outgoing signal is applied to each of the phase delay elements 14-1 to 14-7. Due to the phase delays, the signal is transmitted from the various elements 12-7 to 12-1 with an increasing delay. The corresponding wave fronts produced by each of these elemental antennae will effectively sum to produce a wavefront principally orientated as in the direction of wave 20 shown in FIG. 1.

The above principles may be applied to a two-dimensional matrix array, whereby the directional sensitivity of the phased array antenna may be adjusted in both azimuth and elevation by suitably setting the various phase delays.

A great advantage of the phased array antenna is in that the directional response of the antenna may be altered electronically, by suitable control of electronic phase delay elements 14. The antenna may therefore be "pointed" in a required direction without any mechanical movement of the antenna. This allows for simplification of antenna installation, and allows the direction of the antenna to be changed very rapidly.

Another advantage of phased array antennae is in the improved signal/noise ratio in the final output signal. As the number n of elements in the array increases, the noise signal increases as $\sqrt{n}$, while the signal strength increases as n. The improvement in signal-to-noise ratio, as compared to a single antenna element, is n. Accordingly, a high number of antenna elements should be used to give a good signal/noise ratio. Depending on the application, seven elements (as shown in FIG. 1) may provide sufficient directionality and signal-to-noise ratio. However, it is common to use much larger numbers of antenna elements. Some communications or radar receivers are known having tens of thousands of elements, each with their own associated phase delay. Such an arrangement obviously provides a much increased signal-to-noise ratio, but can lead to problems in processing such a large amount of data.

Figure 2:
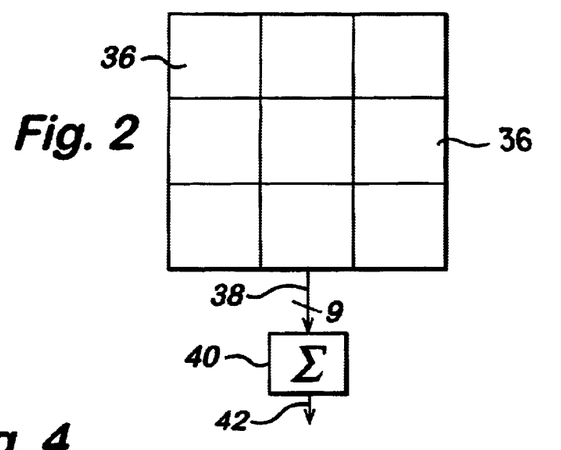
FIG. 2 shows a plurality of antenna elements arranged into sub-arrays.

Since the antenna array can only receive or transmit one signal at a time, all of the signals from the numerous elements must be added together to produce a single output signal. As shown in FIG. 2, the antenna elements 12 may be arranged into sub-arrays 36. Each sub-array will contain the equipment illustrated in FIG. 1, that is, the associated antenna elements 12, their phase delay units 14, and a summing unit 22. Each sub-array 36 then produces a single output signal, 38, and these signals from the sub-arrays are summed in a further summing unit 40 to produce the required single output signal 42, representing a combination of the signals from all of the antenna elements. This arrangement avoids the need for a single summing unit to sum the possibly very numerous signals from the antenna elements 12. The use of sub-arrays also allows certain advanced types of signal processing to be carried out, such as blocking a jamming signal by adjusting the antenna response to ignore the jamming signal, as is known to those skilled in the art.

The phase delays α, 14 applied to each antenna element are the same across all elements 12 in all subarrays.

Another known advantage of arranging the antenna elements into sub-arrays is in that the directional response of the antenna may be adjusted by adjusting the phase of the signals 38 produced by each sub-array.

Figure 3:
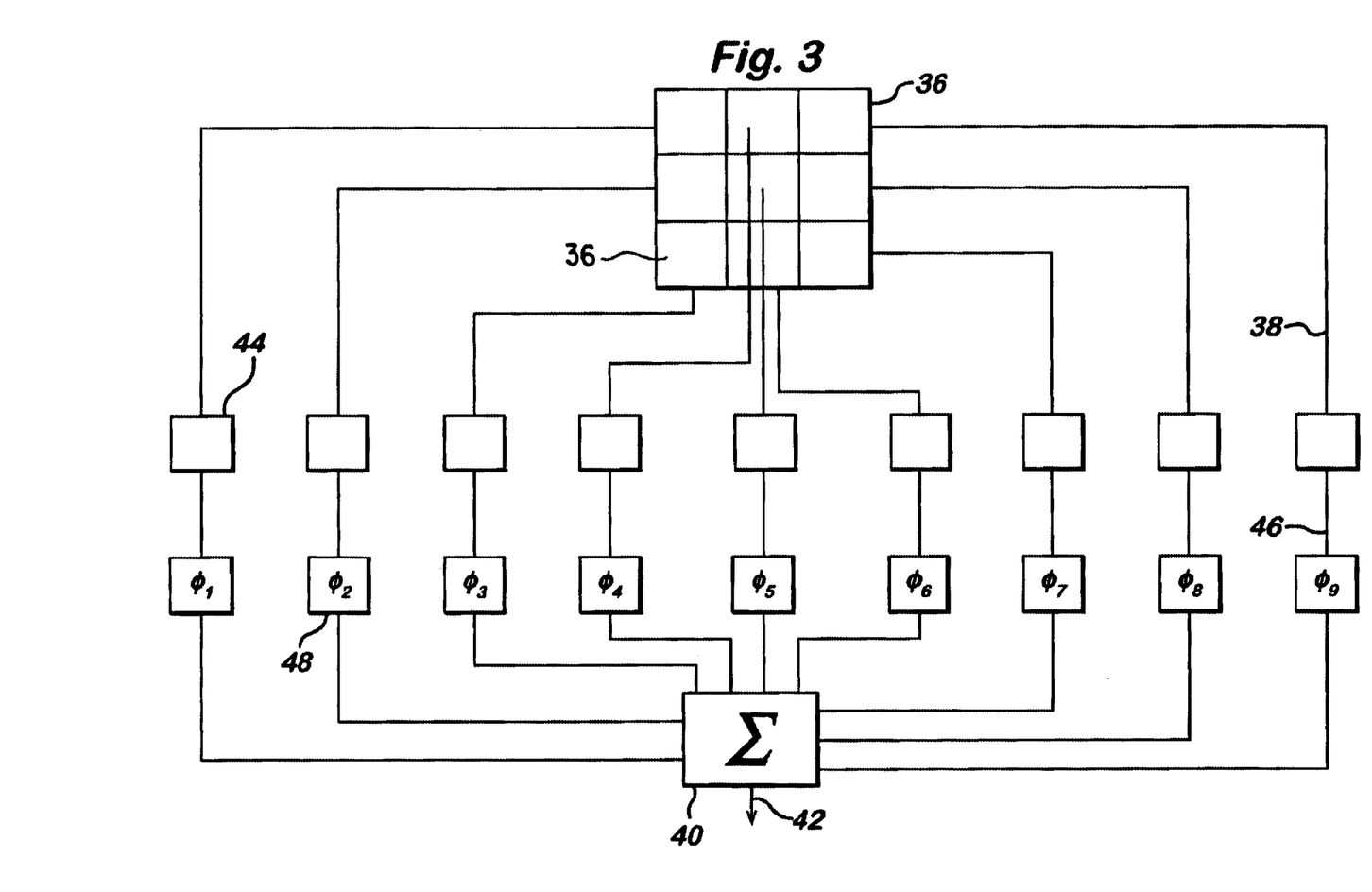
FIG. 3 shows the application of a separate phase delay to the signals from each of the respective sub-arrays.

As shown in FIG. 3, a different phase delay $\phi1$-$\phi9$ may be applied 48 to each of the sub-array signals 38. By treating each sub-array signal 38 in the same way as the element signals of FIG. 1, it can be seen that the response of the whole antenna may be adjusted by adjusting the phase delays $\phi1$-$\phi9$ 48 appropriately. In a two-dimensional antenna such as that shown in FIGS. 2–3, the antenna response in both azimuth and elevation may be adjusted by adjusting the phase delays $\phi1$-$\phi9$ 48.

Analogue-to-digital converters 44 may be introduced to convert the signal 38 from each sub-array 36 into a corresponding digital representation 46, allowing the phase delays $\phi1$-$\phi9$ to be introduced by digital phase shifters 48 before being summed by a digital summing unit 40.

Figure 4:
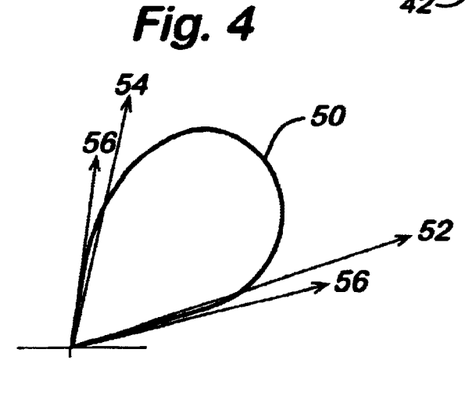
FIG. 4 is a polar diagram of the antenna response as defined by the phase delays of the individual elements in one dimension.

While it is possible to adjust the directionality of the antenna by introducing appropriate phase delays into the sub-array signals 38, this is only possible within the response defined by the phase delays of the individual elements within the subarrays. For example, as shown in FIG. 4, the response of the antenna as defined by the phase delays of the individual elements in one dimension (azimuth or elevation) as already discussed with relation to FIG. 1, is shown as outer envelope 50 in this polar diagram. By introducing appropriate phase delays into the sub-array signals 38, the direction of maximum sensitivity may be controlled by introducing suitable phase delays φ1-φ9 48, but the range of this adjustment is limited by the overall response 50 of the antenna as defined by the phase delays 14 of the individual elements 12. For example, by adjusting phase delays φ1-φ9 48 to provide maximum response in directions 52 or 54, the sensitivity will be reduced by about half and significant side lobes will be produced. If phase delays φ1-φ9 were adjusted further to provide maximum response in a direction 56, for example, the antenna response would be very low.

Using this method, it is possible to provide an antenna response with a plurality of maxima. For example, the subarray outputs may be split a number of ways to form a number of simultaneous beams. By taking the signals output from the subarrays or the digital converters 44 and applying them to two or more sets of phase shifters 48 and summer 40, it is possible to have an antenna response in both directions 52 and 54. This may be achieved by applying different weighting factors to the various subarray signals, in the respective summers. Some subarray signals may have a weighting of zero applied, to eliminate those signals from derivation of the resultant antenna response. The weighting scheme may be variable or adaptive, according to requirements. Alternately, it is common to provide a sum beam for surveillance, and a difference beam for monopulse applications. This may be performed by using a same phase shift to each subarray signal, with differing weighting to provide sum and difference beams in a same direction, or the various phase shifts and weightings may be changed to provide simultaneous beams in differing directions.

A problem arises when performing beam steering and multiple beam formation by use of variable phase shifting and summing of subarray signals. As the phase centres of the subarrays are usually separated by many wavelengths, grating lobes arise.

SUMMARY OF THE INVENTION

An object of the present invention is to alleviate the limitations of sub-array beam steering by reducing the limitations on the range of beam steering that is possible by adjustment of sub-array signal phase delays.

Another object of this invention is to provide a method of operating a subarrayed phased array antenna to allow beam steering by control of sub-array signal phase delays and weighting of various subarray signals in an associated summing step over a wide range.

Accordingly, the present invention provides: a method for operating a phased array antenna, itself comprising a number of sub-arrays, comprising the steps of: introducing phase offsets into signals received from/transmitted to each element in the antenna, to provide directional transmit or receive sensitivity in a first direction; summing signals received from each element in each sub-array to provide respective sub-array signals; introducing respective phase offsets into the respective sub-array signals to adjust the direction of maximum sensitivity (beam magnitude) within a sensitivity envelope defined by the phase offsets applied to each element of the antenna as a whole; further comprising the step of: adjusting the phase offset of each element of each respective sub-array by a respective amount, thereby to alter the directional sensitivity of each respective sub-array, respective sub-arrays having the phase offset of their elements adjusted by differing amounts (φ1-φ9), thereby providing the sub-arrays with a variety of directional sensitivities diverging from the first direction.

Each sub-array may be controlled such that each signal produced by an antenna element is adjusted to direct the maximum sensitivity of the sub-array in a different direction from the maximum sensitivity of other sub-arrays.

Adjustment of the phase offsets applied to the sub-array signals may allow the maximum sensitivity of the whole phased array antenna to be adjusted over a range varying between extremes of the directional sensitivities of the sub-arrays.

The sub-arrays may be arranged in a one-dimensional or two-dimensional array, and that the phase offsets applied to the antenna elements and the sub-array signals provide beam steering respectively in one or two dimensions. The present invention also provides a phased array antenna comprising a matrix of sub-arrays, each sub-array having a corresponding plurality of antenna elements, each antenna element having an associated phase shifting element applying a phase shift to a signal received by the phase shifting element for transmission by, or in response to reception by, a corresponding antenna element, each antenna element of a first sub-array having a first value of a phase shift applied to the corresponding signal, each antenna element of a second sub-array having a second value of a phase shift applied to the corresponding signal.

Each sub-array may further comprise a sub-array summing unit for summing the signals received from each of the antenna elements.

The sub-array summing unit may apply differing weighting values to signals received from differing antenna elements, thereby to provide a degree of aperture shading.

The phased array antenna may further comprise a further summing unit for summing the signals produced by each of the sub-array summing units to produce a received antenna signal having a response equivalent to a combination of the responses of each sub-array.

The further summing unit may apply differing weighting values to signals received from differing sub-arrays, thereby to provide a degree of beam steering.

The summing unit may be arranged to apply a zero weighting to the signals received from certain sub-arrays, thereby eliminating the contribution of the corresponding sub-arrays from the response of the antenna.

Each antenna element of a first sub-array may have a first value of a phase shift applied to the corresponding signal. Each antenna element of a second subarray may haveing a second value (φ2) of a phase shift applied to the corresponding signal.

The phased array antenna of the present invention may comprise a plurality of sub-arrays, each sub-array having different phase shifts applied to the signals received from/supplied to their antenna elements. At least two different combinations of sub-array signals are summed to provide an antenna response comprising a corresponding at least two response maxima representing a combination of the individual responses of such sums, each of such maxima representing an antenna response corresponding to a combination of the responses of the sub-arrays whose output is summed. In such a phased array antenna, the resultant antenna response may comprise a plurality of relatively high gain responses in first directions separated by a corresponding plurality of relatively low gain responses in second directions, each of said first directions lying between a pair of second directions. In this case, all of first and second directions preferably lie substantially in a first plane. The first plane may be swept through an angle, itself in a plane substantially orthogonal to the first plane. The antenna may be arranged to perform sweeping by adjustment of phase shifts applied to individual antenna elements, and/or to sub-array signals.

In a phased array antenna according to the present invention, the antenna may comprise a face divided into regions, each region containing the antenna elements of a respective sub-array. The boundaries between the regions may be randomised.

The phased array antenna according to the present invention may further comprise a digital converter associated with each sub-array signal for providing a digital representation of the sub-array signal. The digital representation of the sub-array signals may be provided to at least one digital summing unit to provide a digital representation of the sum of the corresponding sub-array signals.

The direction(s) of maximum response of the antenna of the present invention may be scanned across a certain angle by adjusting the phase shifts applied to the signals from/to each antenna element.

In a method or an antenna according to the present invention, the direction(s) of maximum response of the antenna may be scanned across a certain angle by adjusting the phase shifts applied to the signals from/to each sub-array.

The method according to the present invention may further comprise the steps of scanning the direction(s) of maximum response through an angle in order to locate an object, then tracking the location of that object by suitable adjusting the phase shifts applied to the antenna element signals and/or the sub-array signals, thereby to maintain a maximum response in a direction substantially corresponding to the direction of the location of the object. In such a method, the sub-arrays of the antenna may be configured such that all sub-array signals have a same phase shift applied, the tracking of the object being achieved by adjusting the phase shifts applied to the individual antenna elements. Alternatively, the sub-arrays of the antenna may be configured such that the antenna elements of each respective sub-array all have a same phase shift applied, the tracking of the object being achieved by adjusting the phase shifts applied to the sub-array signals.

In accordance with the present invention, each sub-array may be controlled so that the phase delay applied to each signal produced by an elemental antenna is adjusted to direct the maximum sensitivity of the sub-array in a different direction from the maximum sensitivity of other sub-arrays.

DETAILED DESCRIPTION OF THE INVENTION

Figure 5:
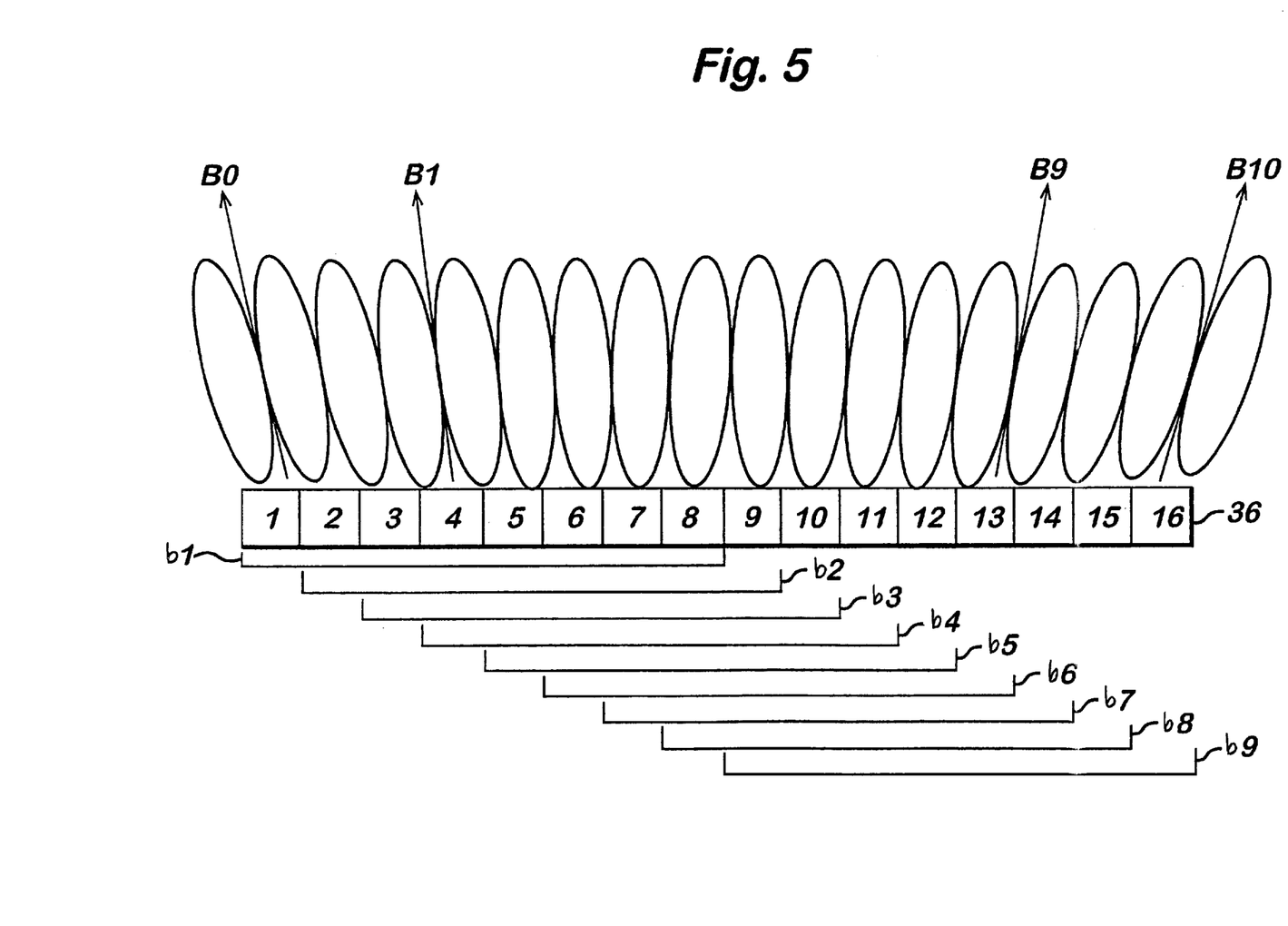
FIG. 5 shows an embodiment of the invention in which each of the sub-arrays is directed in a slightly different direction.

As shown in FIG. 5, each of the sub-arrays 36 may be directed in a slightly different direction. The phase delays 14 of the elements 12 of sub-array 1 are adjusted to move the direction of maximum sensitivity to the left of the overall direction of maximum sensitivity of the antenna. The phase delays 14 of the elements of sub-array 16 are adjusted to move the direction of maximum sensitivity to the right of the overall direction of maximum sensitivity of the antenna. The overall direction of maximum sensitivity of the antenna will in this case be in the general direction of the maximum sensitivity of the directionality of each of sub-arrays 8 and 9.

One result of this is that the antenna will have an increased angle of sensitivity. The peak sensitivity will necessarily reduce, as the direction of maximum sensitivity of the antenna as a whole is no longer the direction of maximum sensitivity for each sub-array.

Figure 6:
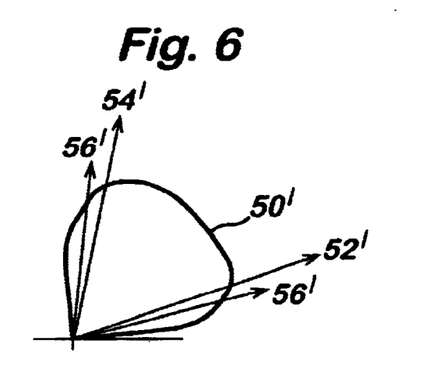
FIG. 6 is a polar diagram of antenna response for a phased array antenna such as illustrated in FIG. 5.

FIG. 6 shows a polar diagram of antenna response for a phased array antenna modified according to the present invention and as discussed with reference to FIG. 5. The overall response 50' of the antenna as defined by the phase delays of the individual elements 12 has a reduced peak value, but is spread over a much wider angle. Adjusting phase delays $\phi 1$-$\phi 9$ will provide significant response in any direction from 56' to 56', a much wider range than possible with the known arrangement, compare FIG. 4.

If all sub-arrays, each pointing in a slightly different direction, are used, a problem arises in that the whole antenna array becomes sensitive to signals arriving from other, unintended directions. For example, if the sub-array signals are phase adjusted to provide maximum sensitivity in a direction between the orientation of sub-arrays 1 and 2 (FIG. 5), approximately corresponding to direction 54' in FIG. 6, then the sub-array 16 in FIG. 5 may not be able to receive in that direction, but will be sensitive in other directions such as direction 52' in FIG. 6, leading to an increase in noise in the summed signal 42 provided by the antenna as a whole.

According to a further aspect of the present invention, certain embodiments of the present invention may only use a certain subset of the total number of sub-arrays. The others are excluded from the summing operation, for example, by suitably programming the summing unit 40 shown in FIG. 3, perhaps by setting the corresponding weighting factors to zero. This provides a first adjustment to the directionality of the antenna, the directionality having initially been fixed by the initial phase delays 14 applied to the signals output from each of the antenna elements 12. Accordingly, the direction of maximum sensitivity, fixed by the initial setting of the phase delays 14 of the individual elements 12, and located between the directionalities of sub-arrays 8 and 9 of FIG. 5 is adjusted by selecting a certain subset of the sub-arrays. For example, by combining the signals from sub-arrays 1–8 and ignoring the signals from other sub-arrays, a maximum sensitivity can be achieved in a direction substantially midway between the directionalities of sub-arrays 4 and 5. Corresponding operation may be achieved in other directions by selecting other adjacent sub-sets of sub-arrays. For example, suitable sub-sets of sub-arrays are labelled b1–b9 in FIG. 5, and may be used to control maximum sensitivity of the antenna over a range from direction B1 to direction B9. The subsets b1–b9 respectively comprise sub-arrays 1–8; 2–9; 3–10; 4–11; 5–12; 6–13; 7–14; 8–15; and 9–16. Other subsets may be used. For example, using subsets of only two sub-arrays would allow maximum sensitivity to be adjustable between directions B0 and B10, but with a lower overall sensitivity due to the reduced number of sub-arrays in use.

This directionality of the antenna response as a whole can be further adjusted by appropriately adjusting the phase delays 48 applied to the output signals 38 from each of the sub-arrays 36, as discussed in relation to FIG. 3.

By selecting appropriate combinations of sub-arrays, beam sensitivity may be controlled across a wide range of angles, without adjusting the overall antenna directionality, that is, the phase delays 14 applied to signals provided by each antenna element 12. As illustrated in FIG. 5, the example shown of sixteen sub-arrays may be selected eight at a time, to provide a maximum sensibility between the directions of the fourth and fifth member of the subset. This directionality can then be adjusted by applying appropriate phase shifts 48 to the sub-array output signals 38.

The principles of the present invention, as discussed above, may be applied to adjustment of the antenna directional sensibility in azimuth or elevation of a combination of both. The present invention may analogously be applied to the antenna when used for receiving signals.

The subarray signals 38, particularly their digital representation, may be applied to a plurality of sets of phase delays 48 and summing units 40. By suitably adjusting the phase delays and weighting applied to each subarray signal, multiple beams of antenna sensitivity may be simultaneously provided. Each beam may then be steered independently of the other beams, or all beams may be steered together by use of corresponding phase shifts of the subarray signals, or by using a single set of phase delay elements 48 producing signals to a plurality of summing units 40.

Figure 7:
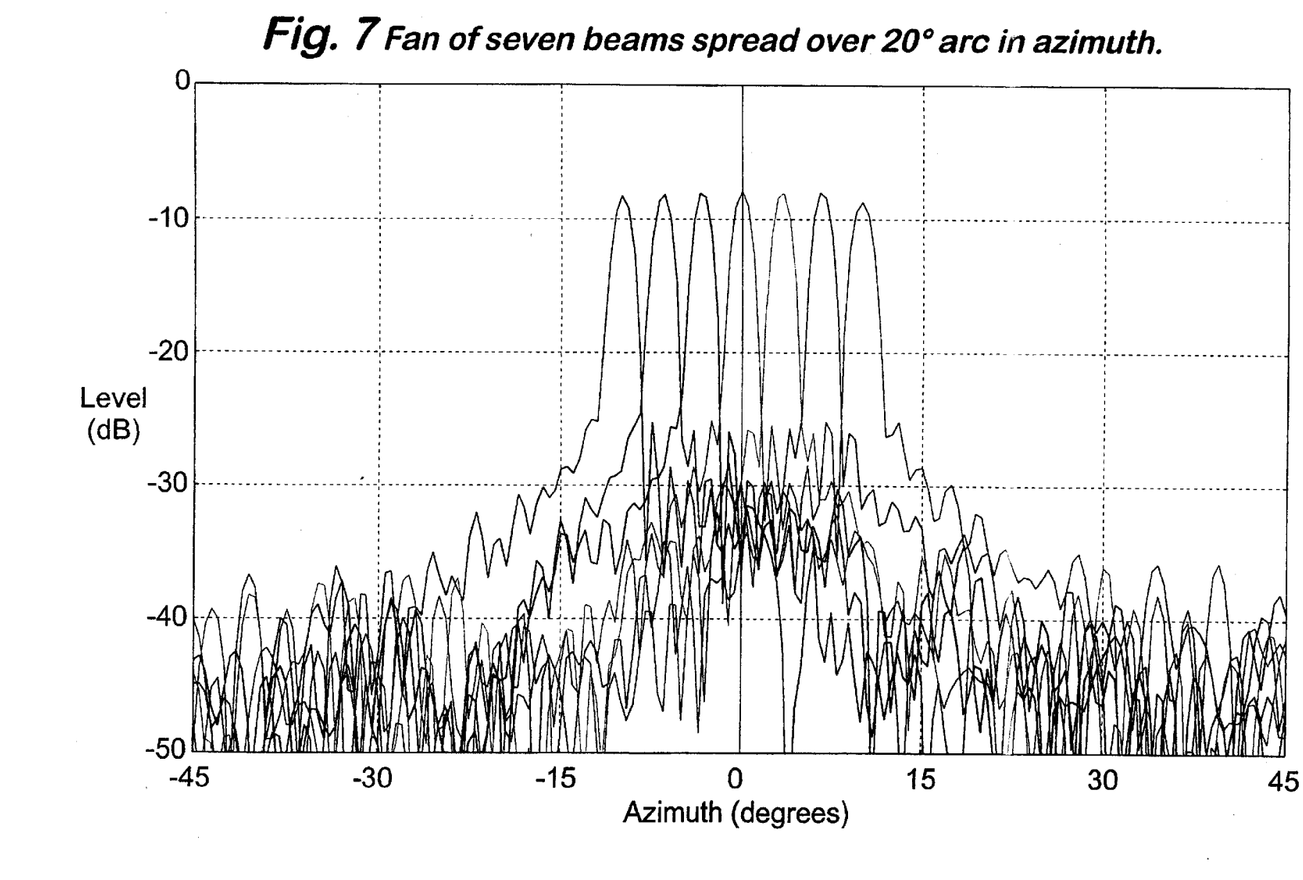
FIG. 7 is a graphic depiction of antenna gain as a function of azimuth angle for a fan of seven beams spread over an arc of 20°.

FIG. 7 shows a set of seven beams; each defined according to the principles defined above, by selecting an appropriate set of sub-arrays. As shown in the diagram, each of these beams is tightly focused, that is, susceptible to signals over a relatively narrow range of incident angles. However, as can be seen in the figure, such beams may cover a range of some 20° without noticeable reduction in gain. The amplitude of noise may be greater than in a conventional phased array antenna, but is acceptable for many activities.

The present invention allows multiple beams to be accessed across a wide field of view, in rapid succession or simultaneously. For example, the signals provided by each sub-array may be digitised before any phase delay is applied to them. Any number of copies of this digitised sub-array signal may then be made without introducing any additional noise. One copy of each of a selected subset of sub-arrays may then be subjected to required phase delays and summing with the other members of the subset to provide a beam in the required direction. Since multiple copies of each sub-array signal are available, multiple phase shift values may be applied to respective ones of these copies, in order to simultaneously provide numerous beams in different directions. The range of available directions is still limited by the overall antenna response pattern (set by the phase delays applied to the output signals from each of the individual antenna elements), but this is broadened as discussed with reference to FIG. 6 by the adjustment of the orientation of individual sub-arrays.

In known phased array radar installations, it is common for the phase delays of the antenna elements to be continually gradually adjusted to provide a sweeping radar beam to cover a whole field of view. This is typically arranged by providing a raster type scan, scanning a single beam repeatedly across the field of view while slowly moving up or down, or vice versa. This may take several seconds to complete, which may be an unacceptably long time in many radar applications. According to the present invention, a 'fan' of radar beams may be generated simultaneously, for example all aligned in azimuth but separated in elevation. This fan of beams may then be scanned across the field of view, which will significantly shorten the time taken to scan a whole field of view.

As the phase delays respectively applied to the element signals and the sub-array signals are electronically controlled, they may be changed almost instantaneously, to provide rapid switching of the mode of the antenna. For example, a scan may be performed using the fan of beams according to the present invention as described in the preceding paragraph. During the scan, a number of targets may be identified. After the scan has taken place, the phased array antenna may then be controlled to provide pencil-beam accuracy for tracking each of the identified objects. If the objects all lie within a fairly restricted field of view, then the whole antenna may have its subarray signals 38 set up with a same phase delay 44, with sub-array beam steering (FIG. 5) used to track the individual objects. Alternatively, the sub-array signal phase shifting according to the present invention may be applied to the antenna, allowing objects to be tracked over a wider area, again using sub-array beam steering.

In an example, a rectangular array was divided into a number of vertical plank sub-arrays and each sub-array was steered by phase shifters at element level progressively across the array from angles −3θ/2 to +3θ/2 where θ is the maximum beam offset required on either side of the nominal array steer direction. The 3/2 factor was necessary to ensure that the gain of all beams remained constant across the fan. Typically a total of 16 sub-arrays were employed and a subset of 8 to 12 were used for each beam. FIG. 5 shows this diagrammatically. A typical result achieved by this application is shown in FIG. 7.

Figure 8:
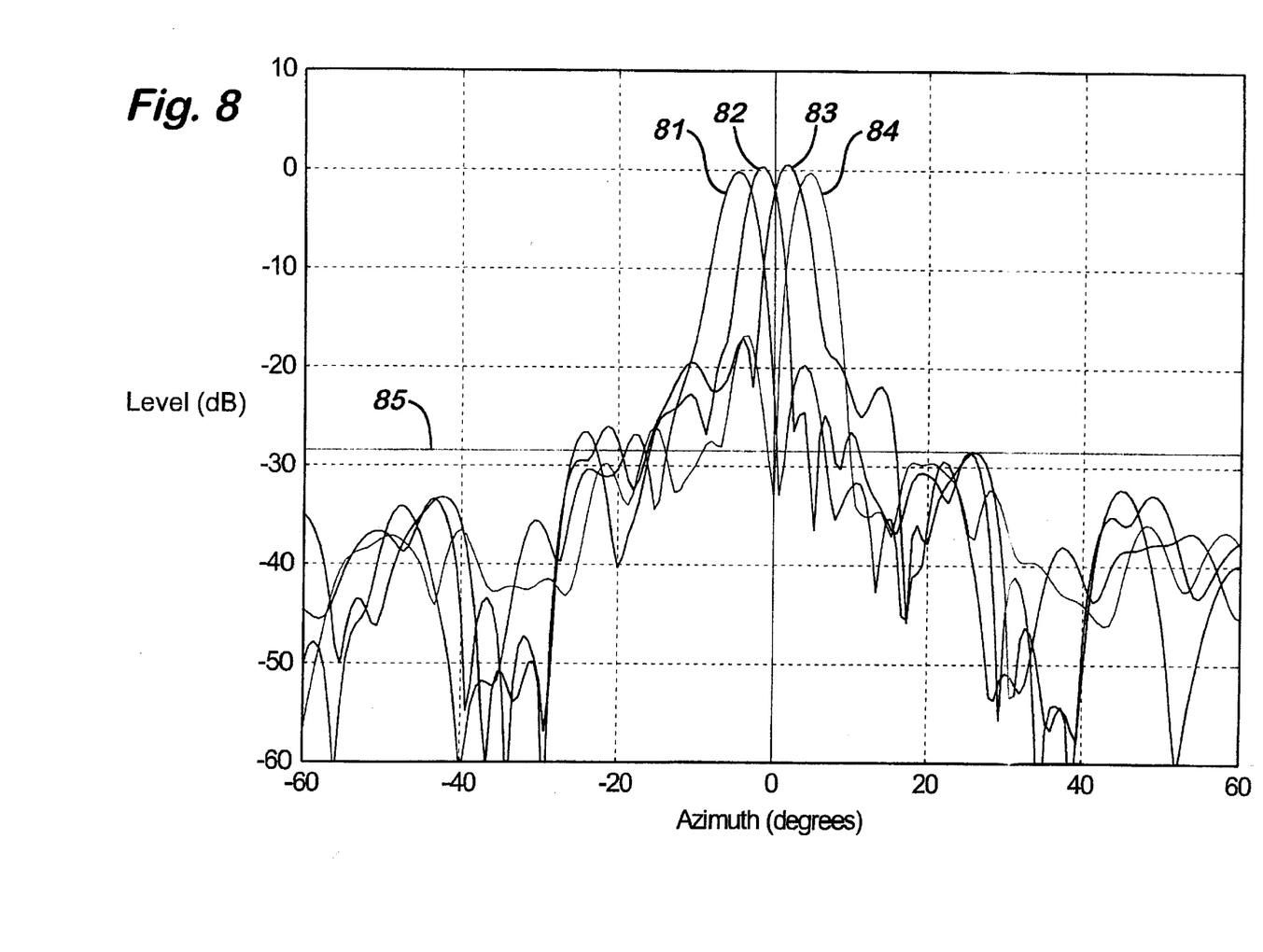
FIGS. 8 and 9 show antenna gain as a function of azimuth angle for a set of simultaneous beams formed using sub-array beam pre-steering and without sub-array beam pre-steering, respectively.
Figure 9:
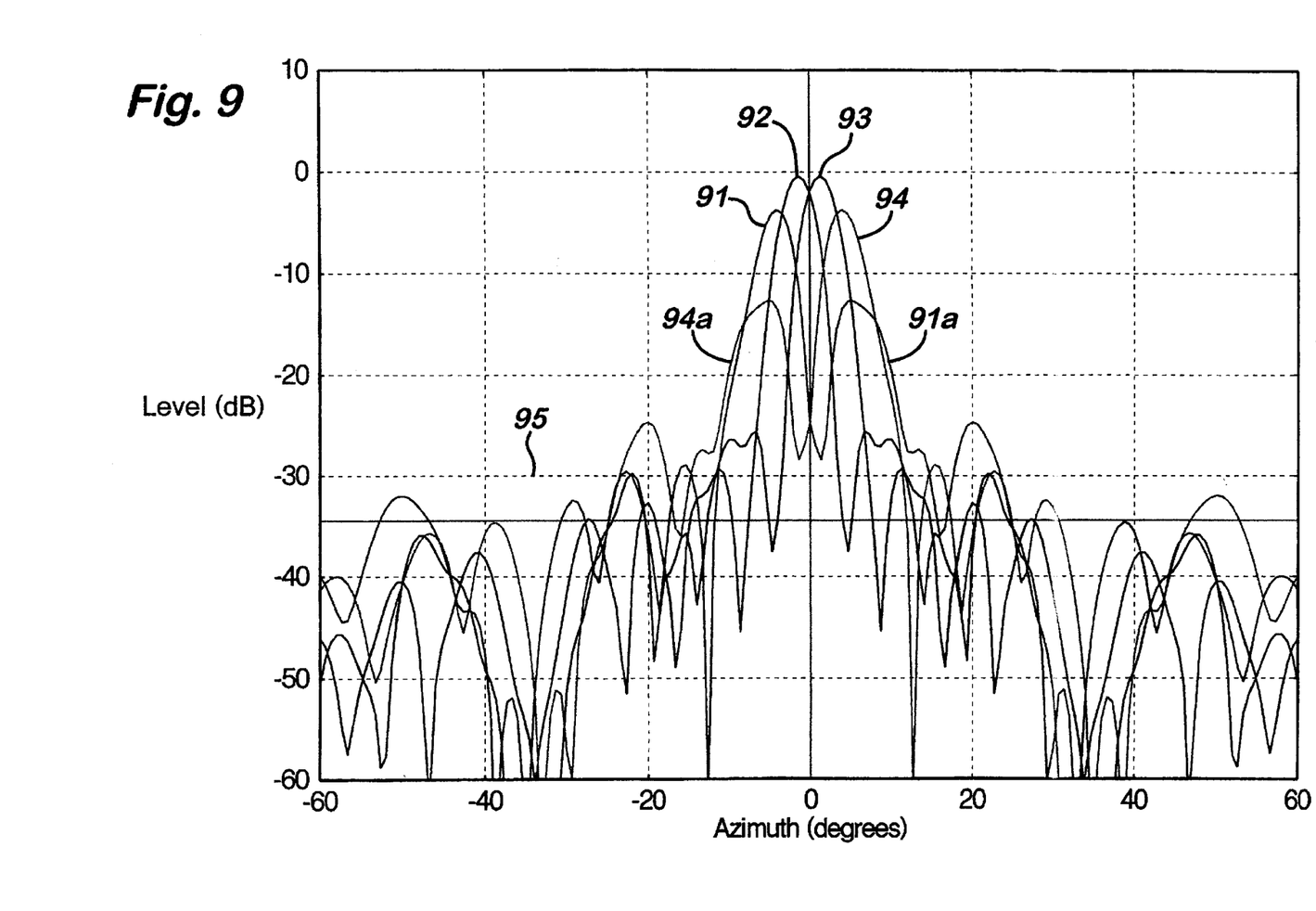

FIGS. 8 and 9 show a set of simultaneous beams formed using sub-array beam pre-steering as in the present invention, and without sub-array beam pre-steering, according to the prior art.

FIG. 8 illustrates a group of four beams 81–84 simultaneously produced by using all 16 sub-arrays of the example of FIG. 5, but summing the respective output signals 38 into subsets of 10 sub-arrays each. The level of isotropic noise is shown at 85. As can be seen from FIG. 8, a beam steering of ±5° is possible, with respect to the direction of maximum sensitivity of the antenna as a whole. As can be seen from a comparison of FIG. 8 with FIG. 9, the present invention shows a wider range of angles available for beam steering without significant loss in gain.

FIG. 9 shows a similar set of beams 91–94 produced by four subsets of eight sub-arrays each, but this time without sub-array pre-steering. That is, all sub-arrays are arranged to have a maximum sensitivity in a same direction, unlike the subarrays of FIG. 5 which each have a maximum sensitivity in a slightly different direction due to the sub-array pre-steering described above. Beam steering is then performed exclusively by adjustment of the phase delay 44 of each subarray signal 38. The level of isotropic noise is shown at 95. As can be seen from FIG. 9, the two outer beams 91, 94, i.e. those at ±5° with respect to the direction of maximum sensitivity of the antenna as a whole, have a significantly reduced level as compared to the two inner beams 92, 93. In addition, the two outer beams 91, 94 also each have significant image beams 91a, 94a with approximately equal and opposite offset. The system of FIG. 9 will accordingly have a much lower signal to noise ratio than the system of FIG. 8.

FIG. 9 shows the set of beams as FIG. 8 but without the use of the pre-steering of the sub-arrays according to the present invention. Here the gain of the outer beams 91, 94 are −4 dB relative to the centre beam and the highest side-lobe is at −9 dB relative to the peak of the beam in question. A comparison of FIGS. 8 and 9 accordingly clearly illustrate one of the major benefits of the present invention, in that beams may be directed over a wider range of angles by the use of sub-array pre-steering according to the present invention, without significant loss of transmit or receive sensitivity.

Figure 10:
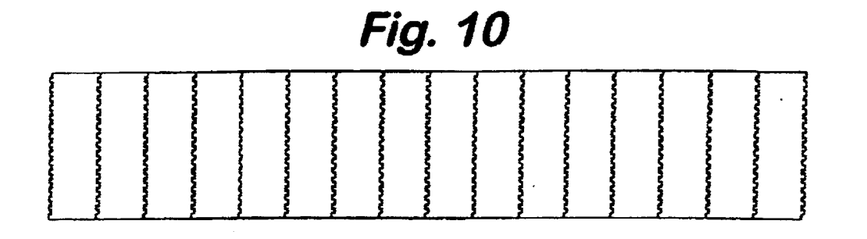
FIG. 10 illustrates an arrangement of sub-arrays on the face of a phased array antenna, suitable for use with the present invention.
Figure 11:
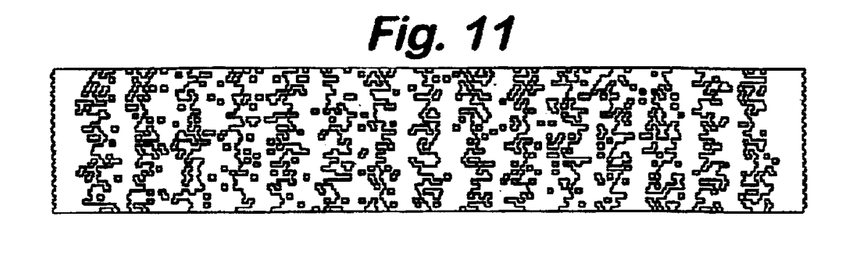
FIG. 11 shows the sixteen sub-arrays of FIG. 10 whose boundaries have been randomised.

FIG. 10 illustrates an arrangement of sub-arrays on the face of a phased array antenna, suitable for use with the present invention. The regular pattern of the subarrays may give rise to problems known as grating effects. Grating lobes are unwanted regions of high antenna gain. The effects of these grating lobes can be reduced to a certain extent by randomising the boundaries between the various subarrays. FIG. 11 shows the sixteen sub-arrays of FIG. 10 whose boundaries have been randomised. This tends to reduce the amplitude of the grating lobes and so reduce the sensitivity of the antenna in unwanted directions.

The present invention therefore provides methods and apparatus for creating a number of simultaneous beams covering a wide angular spread from a phased array antenna. The beams are generated by applying appropriate phase shifts to subarray outputs. A feature of the invention is that it is able to provide a set of substantially equal gain beams with minimal grating lobes by first offsetting the steer directions of the subarrays at element level. The outputs from the subarrays are combined with additional weighting, which may be variable and/or adaptive, to form the final beam. The sub-array outputs may be split a number of ways to form a number of simultaneous beams, commonly a sum beam for surveillance and a difference beam for monopulse.

According to an aspect of the present invention, a number of simultaneous beams, formed at subarray level, may be steered over a wide angular extent without incurring the penalties normally suffered. A feature of the invention is the application of phase shifts at element level so as to steer the subarrays to different directions so that the totality of individual subarray beams covers the angular extent of the output beams required. Each output beam is then formed by combining the outputs of an optimal sub-set of the totality of subarrays. The beam is steered to the required direction by applying an appropriate set of phase shifts to the subarray outputs.

Some loss of gain is inevitable compared to forming a beam conventionally using the whole set, but this may be minimised by optimising the subarray architecture for the particular requirements. The number of subarrays, and hence their dimensions and beam widths, should be chosen so that there is such an overlap between adjacent subarray beams that an appreciable fraction of the total may be employed for each beam. By this means it is possible to generate a set of equal gain beams covering a wide angle. Any grating lobes present are kept to a low level since the degree of steering required at subarray level is much reduced as the subarrays are already steered close to the required directions at element level. Any grating lobes that are present may be reduced still further, if necessary, by introducing a small degree of randomisation into the subarray architecture.

The technique has the advantage that it may be readily implemented with existing phased array antenna architectures without the need for any additional hardware (other than that already needed to form the required number of beams) or modifications to the array face.

While the present invention has been described with reference to a limited number of specific examples, various alterations and amendments may be made within the scope of the present invention. For example, the present invention may be used in conjunction with communications systems having a relatively modest number of sub-arrays and antenna elements, or may be used in conjunction with radar systems in which a far greater number of antenna elements and sub-arrays is used.

What is claimed is:

1. A method for operating a phased array antenna, itself comprising a plurality of sub-arrays, said method comprising:

for each sub-array, introducing phase offsets into signals received from/transmitted to each element in the sub-array, to provide directional transmit or receive sensitivity in a first direction, thereby providing the sub-arrays with a variety of directional sensitivities, and defining a sensitivity envelope for the antenna as a whole;

for each sub-array, summing signals received from each element thereof to provide respective sub-array signals; and for each sub-array, introducing respective phase offsets into the respective sub-array signal, wherein, at least two different combinations of sub-array signals are each summed, to provide an antenna response comprising a corresponding at least two response maximum representing a combination of the individual responses of such sums, each of such maxima representing an antenna response corresponding to a combination of the responses of the sub-arrays whose outputs are summed.

2. A method according to claim 1 wherein each sub-array is controlled such that each signal produced by an antenna element is adjusted to direct the maximum sensitivity of the sub-array in a different direction from the maximum sensitivity of other sub-arrays.

3. A method according to claim 1 wherein adjustment of the phase offsets applied to the sub-array signals allows the maximum sensitivity of the whole phased array antenna to be adjusted over a range varying between extremes of the directional sensitivities of the sub-arrays.

4. A method according to claim 1, wherein the sub-arrays are arranged in a one-dimensional or two-dimensional array, and that the phase offsets applied to the antenna elements and the sub-array signals provide beam steering respectively in one or two dimensions.

5. A method according to claim 1, wherein the direction or directions of maximum response of the antenna are scanned across a certain angle by adjusting the phase shifts applied to the signals from/to each antenna element.

6. A method according to claim 1, wherein the direction or directions of maximum response of the antenna are scanned across a certain angle by adjusting the phase shifts applied to the signal from/to each sub-array.

7. A method according to claim 1, further comprising the steps of scanning the direction or directions of maximum response through an angle in order to locate an object, then tracking the location of that object by suitable adjusting of the phase shifts applied to the antenna element signals and/or the sub-array signals, thereby to maintain a maximum response in a direction substantially corresponding to the direction of the location of the object.

8. A method according to claim 7 wherein the sub-arrays of the antenna are configured such that all sub-array signals have a same phase shift applied, the tracking of the object being achieved by adjusting the phase shifts applied to the individual antenna elements.

9. A method according to claim 7 wherein the sub-arrays of the antenna are configured such that the antenna elements of each respective sub-array all have a same phase shift applied, the tracking of the object being achieved by adjusting the phase shifts applied to the sub-array signals.

10. A phased array antenna comprising:
- a matrix of sub-arrays, each sub-array having a corresponding plurality of antenna elements, each antenna element having an associated phase shifting element applying a phase shift to a signal received by the phase shifting element for transmission by, or in response to reception by, a corresponding antenna element, and sub-array summing unit, providing a respective sub-array signal, having directional transmit or receive sensitivity in a respective first direction for each sub-array;
- a respective sub-array phase delay applied to the respective sub-array signal; and
- a further summing unit arranged to sum the phase delayed sub-array signals to produce a received antenna signal having a response equivalent to a combination of the responses of each sub-array; wherein,
- the sub-arrays have different respective phase delays applied to the respective sub-array signals; and
- at least two different combinations of sub-array signals are each summed to provide an antenna response comprising a corresponding at least two response maxima representing a combination of the individual responses of such sums, each of such maxima representing an antenna response corresponding to a combination of the responses of the sub-arrays whose output is summed.

11. A phased array antenna according to claim 10 wherein the sub-array summing unit applies differing weighting values to signals received from differing antenna elements, thereby to provide a degree of aperture shading.

12. A phased array antenna according to claim 10 wherein the further summing unit applies differing weighting values to signals received from differing sub-arrays, thereby to provide a degree of beam steering.

13. A phased array antenna according to claim 12 wherein the summing unit is arranged to apply a zero weighting to the signals received from certain sub-arrays, thereby eliminating the contribution of the corresponding sub-arrays from the response of the antenna.

14. A phased array antenna according to claim 10 wherein:
- a first sub-array has a first value of a phase shift applied to the corresponding sub-array signal; and
- each antenna element of a second sub-array has a second value of a phase shift applied to the corresponding sub-array signal.

15. A phased array antenna according to claim 14 wherein the resultant antenna response comprises a plurality of relatively high gain responses in first directions separated by a corresponding plurality of relatively low gain responses in second directions, each of said first directions lying between a pair of second directions.

16. A phased array antenna according to claim 15 wherein all of first and second directions lie substantially in a first plane and wherein the first plane is swept through an angle, itself in a plane substantially orthogonal to the first plane.

17. A phased antenna according to claim 16 wherein the antenna is arranged to perform sweeping by adjustment of phase shifts applied to individual antenna elements, and/or to sub-array signals.

18. A phased array antenna according to claim 10 wherein the antenna comprises a face divided into regions, each region containing the antenna elements of a respective sub-array.

19. A phased array antenna according to claim 18 wherein the boundaries between the regions are randomised.

20. A phased array antenna according to claim 10 further comprising a digital converter associated with each sub-array signal for providing a digital representation of the sub-array signal.

21. A phased array antenna according to claim 20 wherein the digital representation o the sub-array signals are provided to at least one digital summing unit to provide a digital representation of the sum of the corresponding sub-array signals.

* * * * *